June 28, 1955   F. MÖLLER   2,711,785
AUTOMOBILE BACK-REST SUPPORTS
Filed Jan. 6, 1951
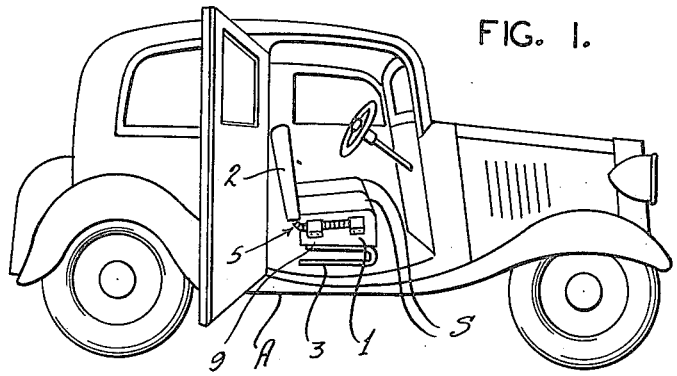
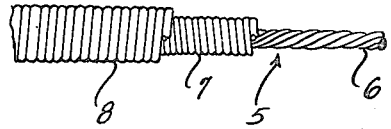
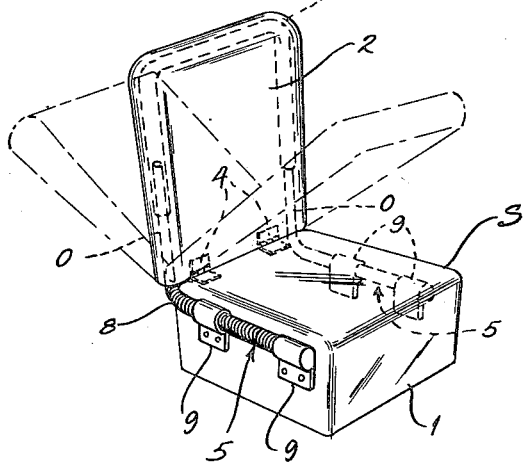
INVENTOR.
FRITZ MÖLLER
BY
ATTORNEY

2,711,785
AUTOMOBILE BACK-REST SUPPORTS

Fritz Möller, Bezirk Kassel, Germany, assignor to Charles Robert William Stephan and Barrett Eugene Gourley, both of St. Louis, Mo.

Application January 6, 1951, Serial No. 204,777

4 Claims. (Cl. 155—164)

My invention has relation to improvements in supports for back-rests, and it consists in the novel features of construction more specifically described in the specification and pointed out in the claims.

The invention is directed more particularly to back supports of automobile seats and consists essentially in providing a spring support that is readily movable or yielding under pressure.

The principal object of the invention is to provide a back support that may be hinged to the seat in the usual manner but is held in adjusted position by a simple spring expedient to be described hereinafter. Other objects of the invention are simplicity of construction and the minimum cost of manufacture to obtain the desired results. These objects, together with other advantages, will be better apparent from a detailed description of the invention in connection with the accompanying drawings, in which:

Figure 1 is a pictorial view of an automobile showing a seat with a back-rest embodying my invention therein; Figure 2 is a perspective view of a seat with a back-rest supported by a spring construction embodying my invention; and Figure 3 is a fragmentary detail of the supporting mechanism for the back-rest.

Referring to the drawings, A represents an automobile in which there are two independent front seats S, S. Each of the seats S embodies a bottom 1 and a back 2, the former being supported by a spring 3 (as shown, Figure 1) and the latter being hinged at 4 and maintained in the desired angular position by a tubular spring arrangement 5. The tubular spring arrangement 5 is made up of a flexible core 6, which may be wire cable, and oppositely wound springs 7 and 8 disposed thereover. This spring arrangement gives sufficient rigidity to the back-rest to support the average weight of a person reclining against the back-rest but at the same time is yielding so that under sudden pressure it will absorb the shock to protect the occupant of the seat. The tubular spring arrangement 5 is securely fixed by clamps 9, 9 to the sides of the bottom 1 and pass upwardly through openings o, o into a U-shaped tube 10 marginally embodied in the back 2.

It is thus apparent that the back 2 may be set angularly into the desired position and at the same time will present sufficient resistance to pressure to support the weight of a person reclining against the same, however yielding to impact so as not to crush the chest of the driver in case of an accident.

I have found that the most satisfactory position for the back 2 when the seat is unoccupied is the forward position (dot and dash line) shown in Figure 2. This is accomplished by "setting" the spring arrangement at this angle when manufactured. The angularity of the spring elements should be about 60° with the vertical and the combined stiffness of the spring arrangement 5 sufficient to support the weight of an average sized person in an erect position for driving (full line position of back 5, Figure 2). The inherent tension of the spring arrangement obviously depends on the size and temper of the wires making up the core 6 and springs 7 and 8. I have found that the core 6 should be made up of about 15 wires of a diameter of 2 to 3 mm. each. Around this core are the oppositely wound springs 7 and 8. These give body to the spring arrangement.

Having described my invention, I claim:

1. A seat and a back support therefor, said back support having a hinged connection with said seat, and spring braces for the back support operating to yieldingly hold such support in a predetermined position, said braces comprising oppositely wound coil springs and a flexible cable core within said springs, spaced portions of said braces being secured to the seat and back support respectively, the spring braces normally holding the back support in a forwardly tilted position.

2. A seat and a back support therefor as set forth in claim 1 characterized in that the angle of the forward tilt is about 60° from a vertical position.

3. A seat and a back support assembly in combination with an elongated device comprising a continuous coil spring, the end portions of which are secured to the seat and back support respectively and the intermediate portion of which is bent so that the axes of the end portions are at an angle to each other to normally hold the back in a position extending upwardly from the seat but yieldable to pressure by the user.

4. A seat and back support assembly as described in claim 3 which includes a core of spring material within the coil spring and similarly elongated and bent.

References Cited in the file of this patent

UNITED STATES PATENTS

| | | |
|---|---|---|
| 923,626 | Colleran | June 1, 1909 |
| 2,109,080 | Bergmann | Feb. 22, 1938 |

FOREIGN PATENTS

| | | |
|---|---|---|
| 19,986 | Australia | May 13, 1929 |
| 468,767 | Canada | Oct. 17, 1950 |
| 531,313 | Germany | Aug. 13, 1931 |
| 860,938 | France | Oct. 15, 1940 |